(12) United States Patent
Rajauria et al.

(10) Patent No.: US 11,170,814 B1
(45) Date of Patent: Nov. 9, 2021

(54) HEAT TREATMENT OF NFT ON HEAT-ASSISTED MAGNETIC RECORDING DEVICE

(71) Applicant: Western Digital Technologies, Inc., San Jose, CA (US)

(72) Inventors: Sukumar Rajauria, San Jose, CA (US); Oscar Ruiz, San Jose, CA (US); Erhard Schreck, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/911,064

(22) Filed: Jun. 24, 2020

(51) Int. Cl.
| | |
|---|---|
| *G11B 11/105* | (2006.01) |
| *G11B 13/08* | (2006.01) |
| *G11B 5/60* | (2006.01) |
| *G11B 5/48* | (2006.01) |
| *G11B 5/00* | (2006.01) |
| *G11B 7/126* | (2012.01) |

(52) U.S. Cl.
CPC ............ *G11B 13/08* (2013.01); *G11B 5/4866* (2013.01); *G11B 5/6088* (2013.01); *G11B 7/126* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,514,673 | B1 | 8/2013 | Zhao et al. |
| 8,953,422 | B1 | 2/2015 | Cao et al. |
| 9,569,121 | B1 | 2/2017 | Rausch et al. |
| 9,583,135 | B1 * | 2/2017 | Ma ................. G11B 20/1816 |
| 9,916,851 | B1 * | 3/2018 | Seigler ................. G11B 5/02 |
| 9,978,412 | B1 | 5/2018 | Macken et al. |
| 10,204,655 | B1 * | 2/2019 | Ma ..................... G11B 5/012 |
| 10,249,336 | B1 | 4/2019 | Krichevsky et al. |
| 10,482,908 | B2 | 11/2019 | Mendonsa et al. |
| 10,950,266 | B1 * | 3/2021 | Rajauria ............ G11B 5/3133 |
| 2015/0132503 | A1 | 5/2015 | Kautzky et al. |

(Continued)

OTHER PUBLICATIONS

Xiong, Shaomin et al.; A Two-Stage Heating Scheme for Heat Assisted Magnetic Recording; Journal of Applied Physics; 115, 17B702; http://dx.doi.org/10.1063/1.4853275, 2014 (4 pages).

(Continued)

*Primary Examiner* — Tan X Dinh

(74) *Attorney, Agent, or Firm* — Patterson & Sheridan, LLP; Steven H. Versteeg

(57) ABSTRACT

The present disclosure relates to pretreating a magnetic recording head. For a HAMR head, a NFT is present. Current can be applied to the NFT to condition the NFT. The current is applied in one of three ways: slowly ramping up the current from a starting level below a level capable of writing data to the optical laser current over a predetermined period of time, applying the current at a fixed value below the optical laser current for the predetermined period of time, or slowly ramping up the current from a starting level below a level capable of writing data to the optical laser current over the predetermined period of time while also intermittently removing the current. By conditioning the NFT in such a manner, the HAMR head can avoid thermal shock and thermal fatigue and thus increase the lifetime of the magnetic media drive.

19 Claims, 7 Drawing Sheets

(56) References Cited

U.S. PATENT DOCUMENTS

| | | | |
|---|---|---|---|
| 2017/0221511 A1* | 8/2017 | Dai | G11B 5/41 |
| 2018/0114542 A1 | 4/2018 | Rausch et al. | |
| 2019/0066719 A1 | 2/2019 | Macken et al. | |
| 2019/0103132 A1* | 4/2019 | Mendonsa | G11B 5/455 |

OTHER PUBLICATIONS

Xiong, Shaomin et al.; "Setting Write Spacing in Heat Assisted Magnetic Recording", IEEE Transitions on Magnetics, vol. 54, No. 8, Aug. 2018 (7 pages).

* cited by examiner

HEAT TREATMENT OF NFT ON HEAT-ASSISTED MAGNETIC RECORDING DEVICE

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface of the recording medium. As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted recording technology to improve the recording density of a magnetic recording medium. In HAMR, a laser source is located next to or near the write element in order to produce heat, such as a laser source exciting a near-field transducer (NFT) to produce heat at a write location of a magnetic recording medium.

A thermal gradient can develop inside the HAMR head, and different materials for the NFT will have different coefficients of thermal expansion. Furthermore, the HAMR head will undergo multiple cyclic on/off operations. The aforementioned may lead to thermal shock whereby the thermal gradients cause expansion that exceeds stress resistance. Additionally, thermal fatigue can develop due to the repeated thermal loading.

Therefore, there is a need in the art for an improved HAMR magnetic media drive.

SUMMARY OF THE DISCLOSURE

The present disclosure relates to pretreating a magnetic recording head to increase the lifetime of the magnetic media drive. For a heat assisted magnetic recording (HAMR) head, a near field transducer (NFT) is present. A current can be applied to the NFT to heat treatment condition the NFT. The current is applied in one of three ways: slowly ramping up the current from a starting level below a level capable of writing data (e.g., zero) to the optical laser current over a predetermined period of time, applying the current at a fixed value below the optical laser current for the predetermined period of time, or slowly ramping up the current from a starting level below a level capable of writing data (e.g., zero) to the optical laser current over the predetermined period of time while also intermittently removing the current. By heat treating the NFT in such a manner, the HAMR head can avoid thermal shock and thermal fatigue and thus increase the lifetime of the magnetic media drive.

In one embodiment, a magnetic media drive comprises: a magnetic recording head; a magnetic media; and a control unit coupled to the magnetic recording head and the magnetic media, wherein the control unit is configured to: apply laser current to the magnetic recording head by ramping up the current from a first level that is below a laser current level that is capable of writing data to the magnetic media to a laser current that is capable of writing data to the magnetic media over a predetermined period of time.

In another embodiment, a magnetic media drive comprises: a magnetic recording head; a magnetic media; and a control unit coupled to the magnetic recording head and the magnetic media, wherein the control unit is configured to: apply laser current to the magnetic recording head, wherein the laser current is applied at a first level that is below a laser current level capable of writing data to the magnetic media; increase the laser current to the magnetic recording head from the first level to a second level, wherein the second level is below the laser current level capable of writing data to the magnetic media; and increase the laser current to the magnetic recording head from the second level to the laser current level capable of writing data to the magnetic media.

In another embodiment, a magnetic media drive comprises: a magnetic recording head; a magnetic media; and a control unit coupled to the magnetic recording head and the magnetic media, wherein the control unit is configured to: apply laser current to the magnetic recording head, wherein the laser current is applied at a first level that is below a laser current level capable of writing data to the magnetic media, wherein the first level is applied for a first period of time; remove the laser current applied at the first level; apply laser current to the magnetic recording head at a second level that is greater than the first level, wherein the second level is below the laser current level capable of writing data to the magnetic media, wherein the second level is applied for a second period of time; and remove the laser current applied at the second level.

In another embodiment, a method of treating a magnetic recording head comprises: applying a current the magnetic recording head for a first period of time, wherein the current is below a current level capable of writing data to a magnetic recording media; determining one of the following: whether the current level capable of writing data to the magnetic recording media been reached; or whether a predetermined period of time passed; and performing one of the following: continuing to apply the current at the current level capable of writing data to the magnetic recording media for a second period of time; or removing application of the current for a third period of time; or increasing the current to a new current level that is below the current level capable of writing data to the magnetic recording media.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to pretreating a magnetic recording head to increase the lifetime of the magnetic media drive. For a heat assisted magnetic recording (HAMR) head, a near field transducer (NFT) is present. The heat treatment conditioning is done using the different current profile to the laser diode. The current is applied in one of three ways: slowly ramping up the current from zero to the optical laser current over a predetermined period of time, applying the current at a fixed value below the optical laser current for the predetermined period of time, or slowly ramping up the current from zero to the optical laser current over the predetermined period of time while also intermittently removing the current. By heat treating the NFT in such a manner, the HAMR head will avoid thermal shock and thermal fatigue and thus increase the lifetime of the magnetic media drive.

Figure 1:
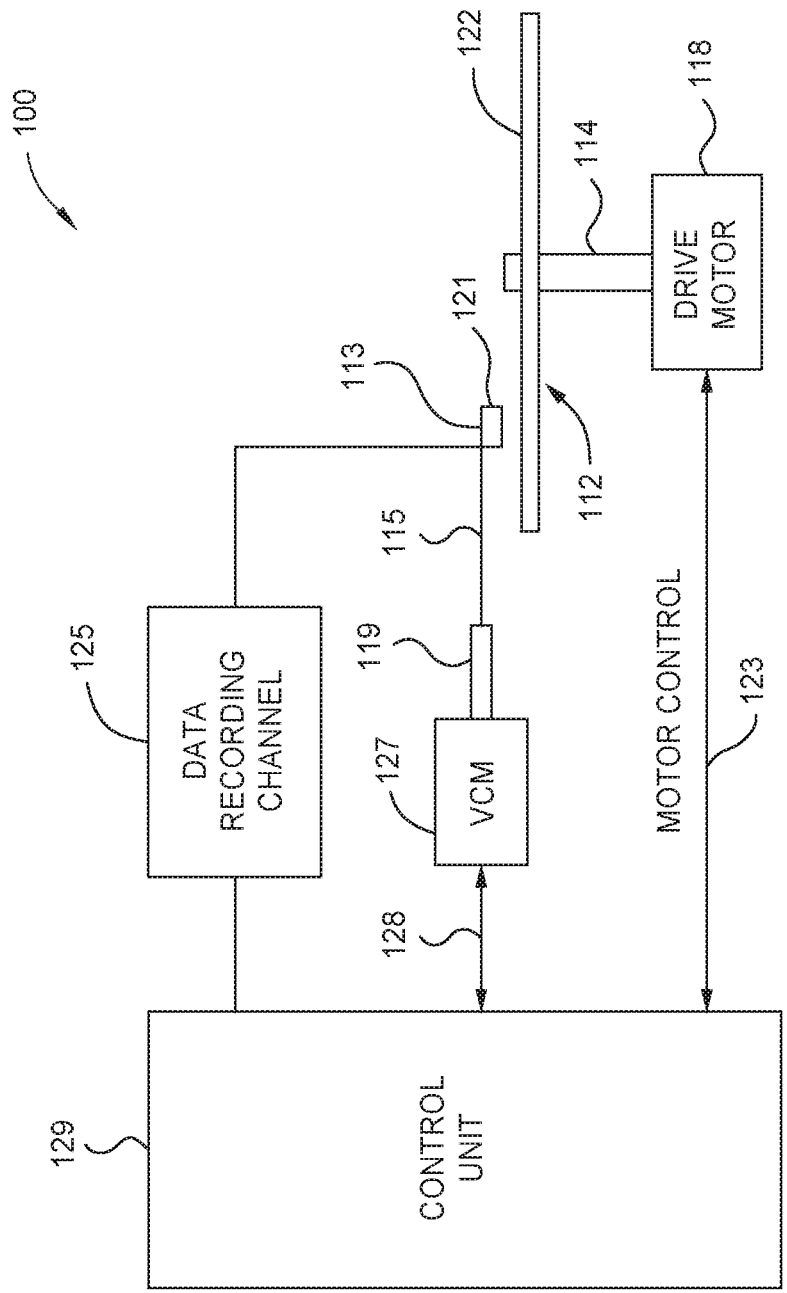
FIG. 1 is a schematic illustration of certain embodiments of a magnetic media drive including a HAMR magnetic write head.

FIG. 1 is a schematic illustration of certain embodiments of a magnetic media drive including a HAMR magnetic write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
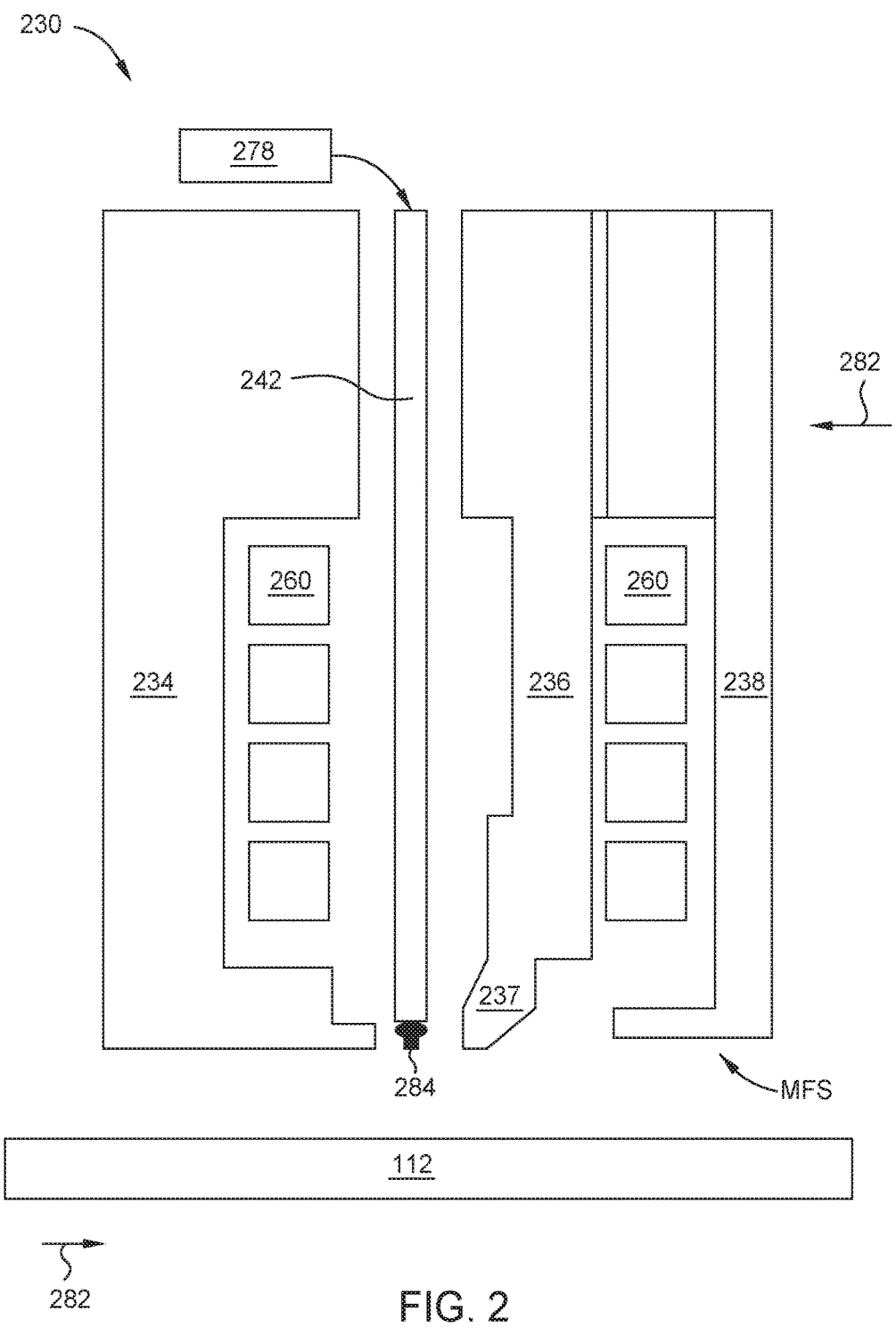
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282.

The HAMR write head 230 includes a main pole 236 disposed between a leading shield 234 and a trailing shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading shield 234 and/or the trailing shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the focal point of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS heating a precise area of the NFT 284 which in turn heats a precise area of the magnetic disk 112. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

Figure 3:
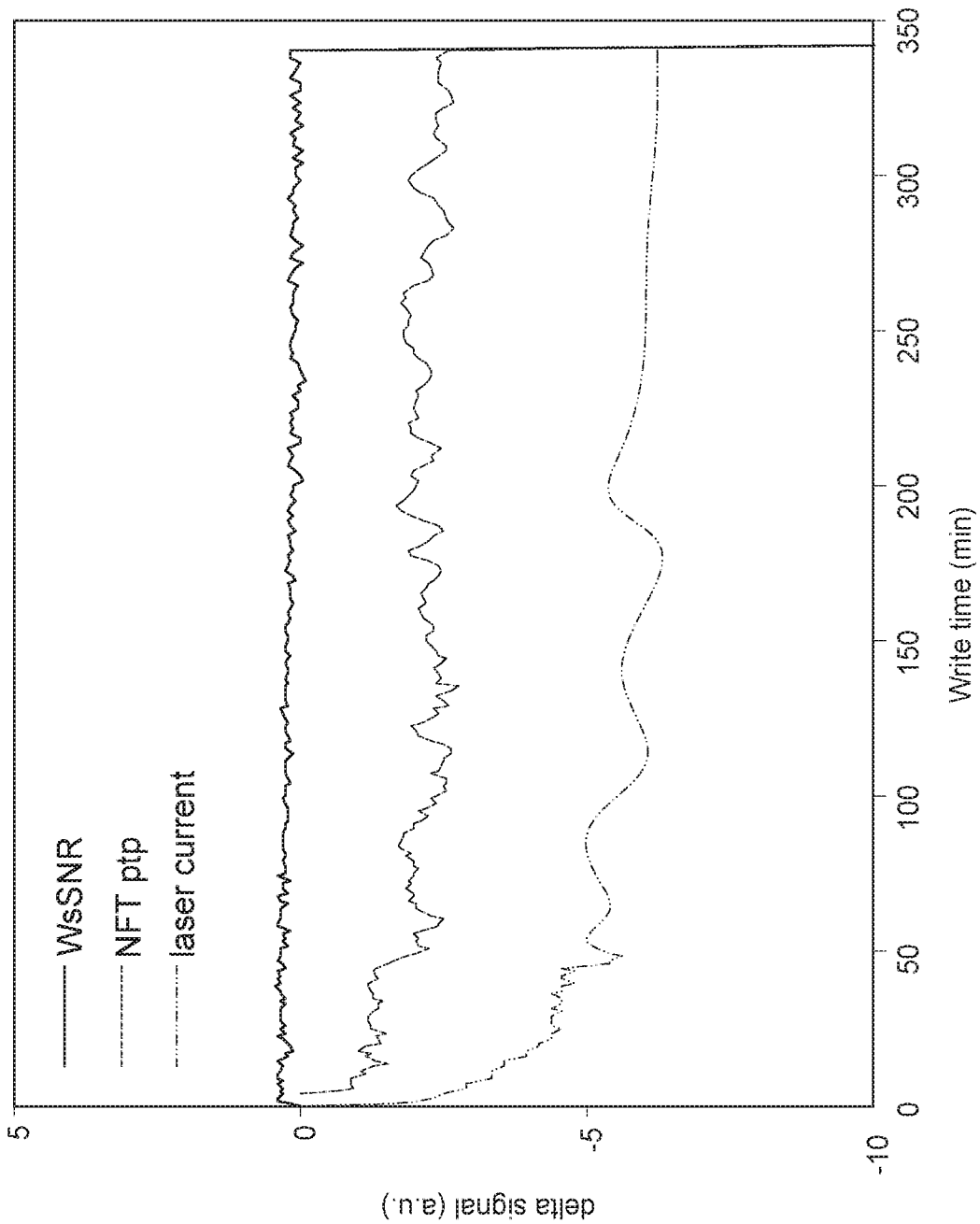
FIG. 3 is a graph illustrating the NFT protrusion efficiency over time.

FIG. 3 is a graph illustrating the NFT protrusion efficiency over time. The graph is showing three separate curves. The top curve is the write source signal to noise ratio (labeled "WsSNR") and is a representation of how the bits are written on the magnetic disk over the lifetime of the device. The top curve is generally flat throughout the lifetime of the device. The bottom curve labeled "laser current" represents laser current delivered to the NFT to be able to write data. It can be assumed that the heat applied to the magnetic disk head from the laser current through the NFT is stable and constant when the laser current is operating at the operational laser current (LOPTI), which is the current level for the laser that is sufficient to write data on the magnetic disk. The bottom curve is a parabolic curve that is generally flat after the initial drop from time zero. The fluctuations in the curve for the bottom curve are minor fluctuations in the current.

The middle curve (NFT ptp) is a NFT protrusion curve showing heat induced protrusions to the NFT over the lifetime of an example device that experienced failure prematurely. As shown in FIG. 3, the lifetime exemplified is less than 350 minutes of operational time, which is insufficient. As shown by the curve, the NFT protrusion efficiency decreases over time until ultimately the device fails prior to 350 minutes. More specifically, the NFT protrusion efficiency over time shown in FIG. 3 illustrates that the NFT is not consistently protruding over the lifetime of the device. Rather, the NFT, and the material around the NFT, is not remaining in the same state. The NFT and surrounding material is changing over time. Thus, the NFT protrusion at the beginning of the lifetime of the device is different from the NFT protrusion near the end of the lifetime of the device, even when the same laser current is applied. What should happen over time is the NFT protrusion should be constant from the beginning of the lifetime of the device until the end of the lifetime of the device. From a curve perspective, the middle curve should be perfectly flat, after the initial drop in the parabolic curve, across the bottom of the parabolic curve. Instead, the curve is not flat and shows sharp protrusions that increase and decrease from the starting use of the laser current through lifetime of the NFT even when the device begins to operate at LOPTI. The middle curve's indication of operating at LOPTI is when the parabolic curve transitions into a horizontal curve as does the bottom curve as seen in the graph. At LOPTI, the middle curve should not have the protrusions shown in FIG. 3. The sharp protrusions on the middle curve represent the heat of the NFT increasing when the laser current is operating throughout the duration of its life. As the heat increases in the NFT, the NFT expands, and as the heat decreases the NFT contracts. The middle curve shows the inefficiency of the NFT protrusion over time. It is believed that the middle curve in FIG. 3 is due to the NFT and surrounding material experiencing thermal shock and fatigue. Such shock and fatigue can have one or more effects: (1) lengthen the time necessary for the NFT to protrude, (2) decrease the amount that the NFT can protrude, (3) decrease the amount that the NFT will retract, and/or (4) increase the amount of time needed for the NFT to retract. In other words, over time, the material surrounding the NFT and/or the NFT itself do not protrude and retract as fast and/or as much as the beginning of the device lifetime. As will be discussed below, a heat treatment performed at the beginning of the life of the device, e.g., prior to device usage in the field, will condition the NFT such that the NFT protrusion and retraction will be much more consistent over time in terms of both distance of protrusion/retraction and time for protruding/retracting. The consistency will lead to longer device lifetime.

Figure 4:
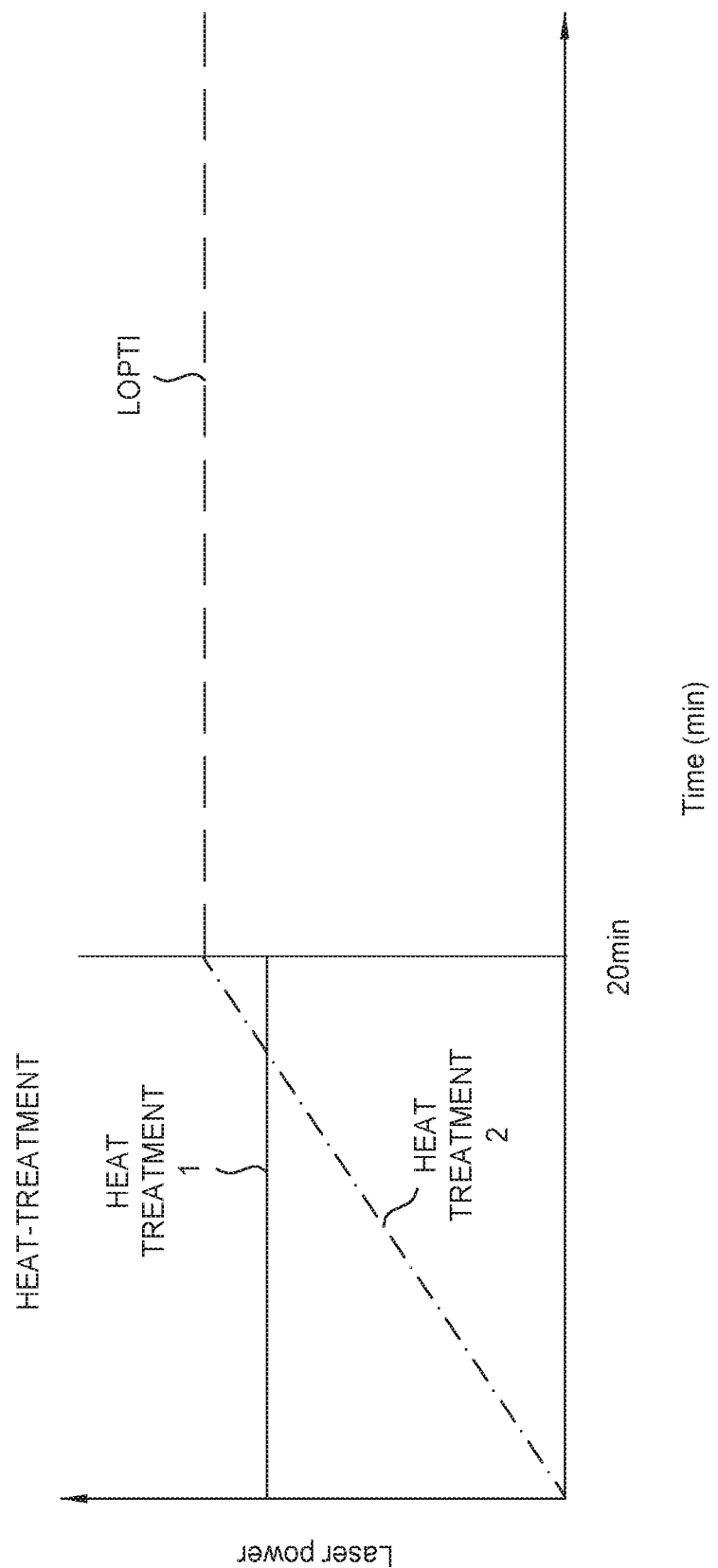
FIG. 4 is a graph illustrating the process of heat treating the NFT according two embodiments.

FIG. 4 is a graph illustrating the impact of heat treating the NFT according two embodiments. For heat treatment 1, a constant laser current is delivered to the NFT for a predetermined period of time. The constant laser current for the predetermined period of time is considered a low shock annealing of the NFT. Under normal operating conditions, i.e., applying LOPTI for the time sufficient to write data to the media, the laser current applied goes from 0 to LOPTI instantly, which creates a thermal shock to the NFT and surrounding material. At LOPTI, the NFT will rapidly expand (and hence protrude) at the beginning of the device lifetime. Thus, for the very first time the device is used, applying LOPTI creates a thermal shock and leads to fatigue of the NFT material and the material therearound. Using heat treatment 1, LOPTI isn't the initial laser current delivered. Rather, a lower laser current (i.e., lower than LOPTI) is delivered to the NFT for a predetermined period of time. In the embodiment of heat treatment 1, the predetermined period of time is sufficient to condition the NFT comprising gold. In FIG. 4, the period of time is shown to be 20 minutes, but it is understood that the predetermined period of time may be greater than or less than 20 minutes such as 18 minutes to about 22 minutes. More specifically, the predetermined period of time may change based upon the material of the NFT. For example, if the NFT comprises a material having a different thermal conductivity, then the predetermined period of time may be different. Tungsten, for example, has a lower thermal conductivity than gold and hence the predetermined period of time for a tungsten NFT would be longer than for gold. Likewise, a gold alloy would likely have a lower thermal conductivity than gold and hence utilize a longer predetermined period of time for conditioning. Additionally, the constant laser power delivered is a predetermined level that is below LOPTI. Thereafter, the device will be able to operate under normal (i.e., LOPTI) operation conditions. As will be discussed below with regards to FIG. 5A, heat treatment 1 results in an improved lifetime for the device as compared to not heat treating the device.

Heat treatment 2 involves gradually increasing the laser current at a constant rate. The laser current is evenly ramped up to LOPTI over a predetermined period of time. In FIG. 4, the period of time is shown to be 20 minutes, but it is understood that the predetermined period of time may be greater than or less than 20 minutes such as 18 minutes to about 22 minutes. As discussed above, the predetermined period of time may change based upon the material of the NFT. For example, if the NFT comprises a material having a different thermal conductivity, then the predetermined period of time may be different. Tungsten, for example, has a lower thermal conductivity than gold and hence the predetermined period of time for a tungsten NFT would be longer than for gold. Likewise, a gold alloy would likely have a lower thermal conductivity than gold and hence utilize a longer predetermined period of time for conditioning. Thereafter, the device will be able to operate under normal (i.e., LOPTI) operations conditions. As will be discussed below with regards to FIG. 5B, heat treatment 2 results in an improved lifetime for the device as compared to not heat treating the device.

Figure 5A:
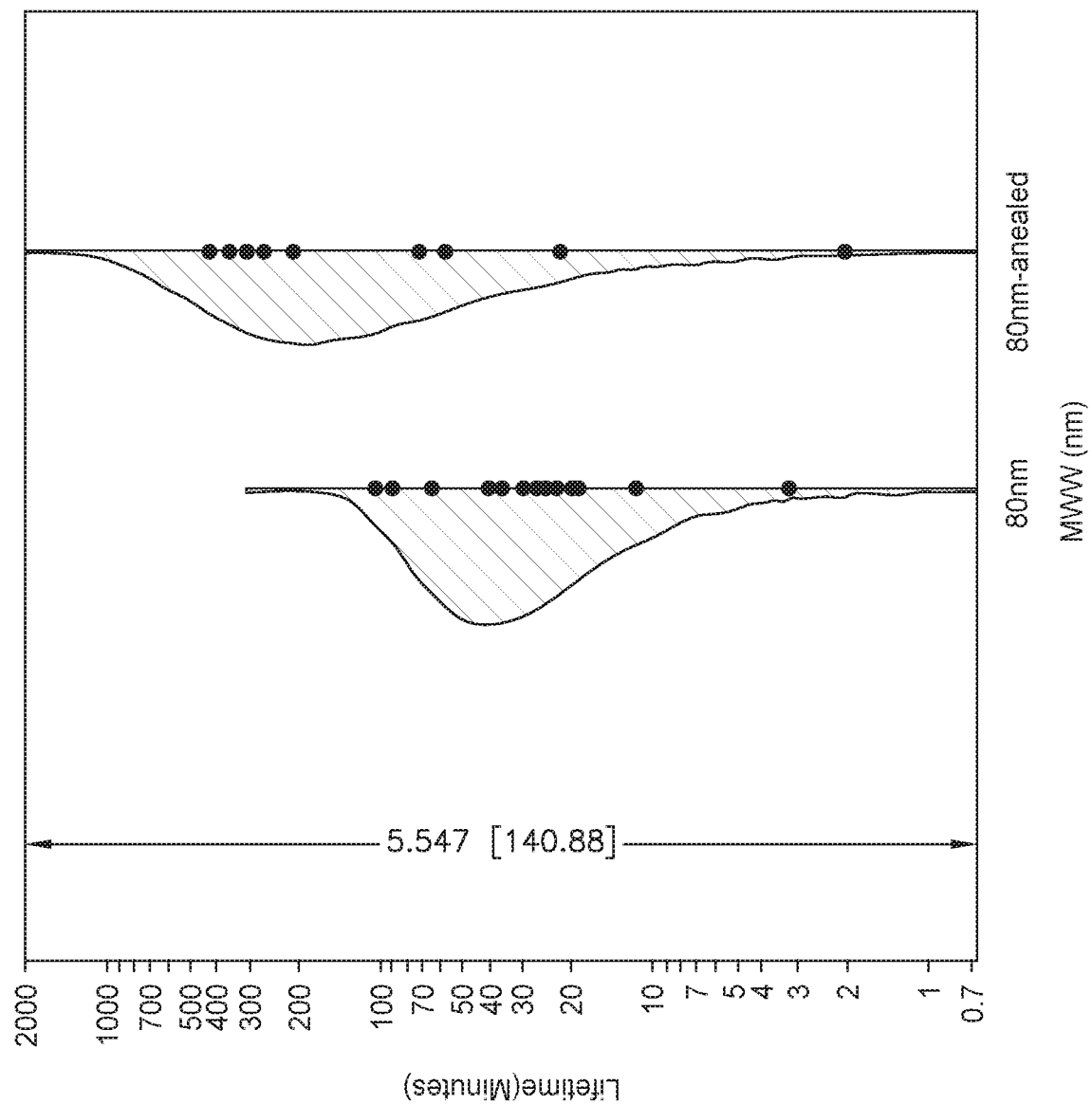
FIG. 5A a graph illustrating the impact of heat treating the NFT according one embodiment.

FIG. 5A a graph illustrating the impact of heat treatment 1 as compared to no heat treatment (i.e., straight to LOPTI without any conditioning of the NFT). The graph shows that the lifetime of the device has a lifetime that is four times greater when performing heat treatment 1 as compared to no heat treatment (i.e., right visual versus left visual).

Figure 5B:
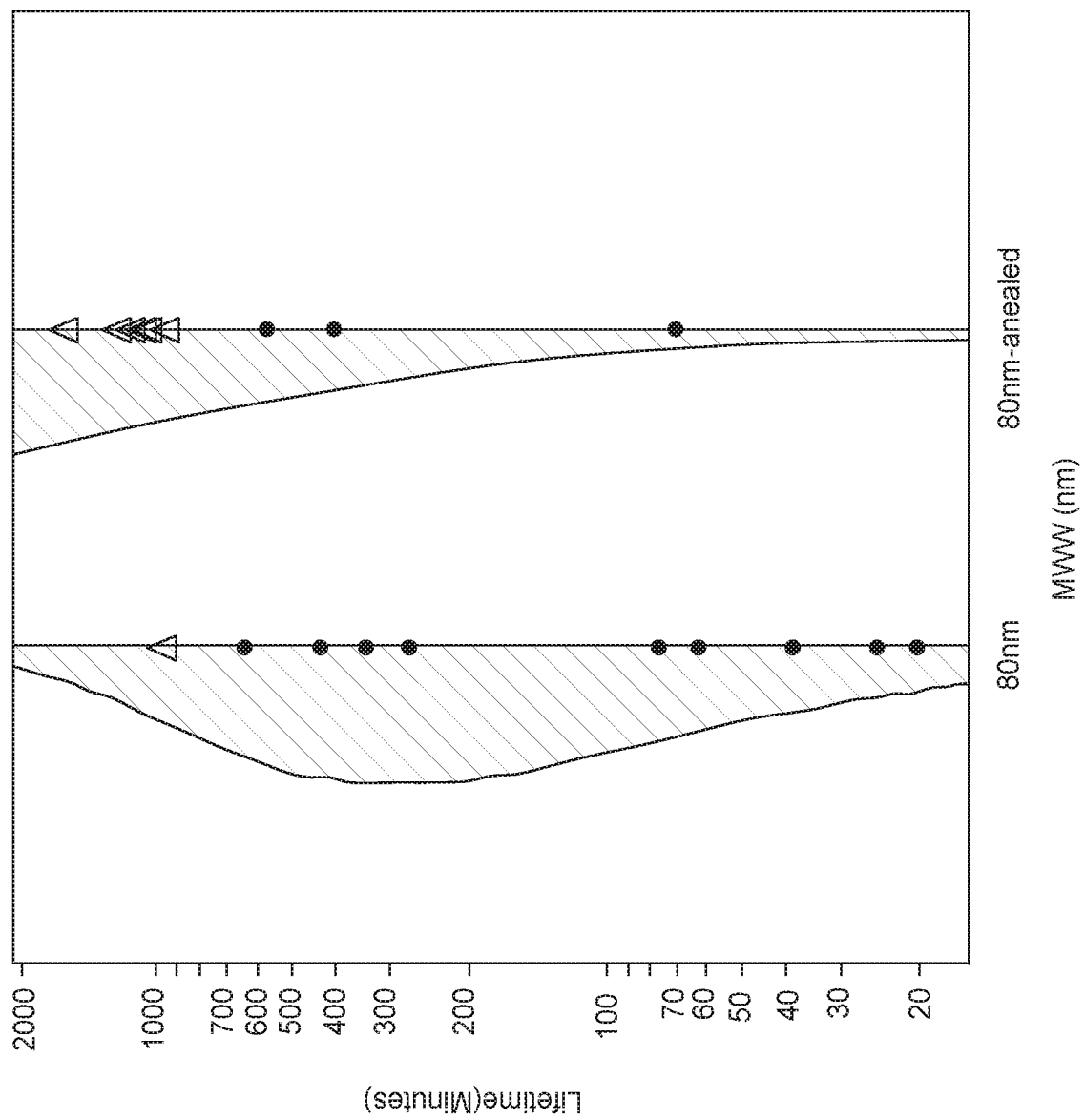
FIG. 5B a graph illustrating the impact of heat treating the NFT according another embodiment.

FIG. 5B a graph illustrating the impact of heat treatment 2 as compared to no heat treatment (i.e., straight to LOPTI without any conditioning of the NFT). The graph shows that the lifetime of the device has a lifetime that is fifteen times greater when performing heat treatment 2 as compared to no heat treatment (i.e., right visual versus left visual).

A third heat treatment option is also contemplated. The third heat treatment is a variation of heat treatment 2. For the third heat treatment option, a pause is inserted during the gradual increasing of laser current. More specifically, the laser current will be gradually increased over a predetermined period of time. The total predetermined period of time may be 20 minutes, but it is understood that the predetermined period of time may be greater than or less than 20 minutes such as 18 minutes to about 22 minutes. As discussed above, the total predetermined period of time may change based upon the material of the NFT. For example, if the NFT comprises a material having a different thermal conductivity, then the total predetermined period of time may be different. Tungsten, for example, has a lower thermal conductivity than gold and hence the total predetermined period of time for a tungsten NFT would be longer than for gold. Likewise, a gold alloy would likely have a lower thermal conductivity than gold and hence utilize a longer total predetermined period of time for conditioning. During the total predetermined period of time, the laser current will be applied for a first period of time and then the current will be removed for a second period of time. In one embodiment, the second period of time is between about 1 us to about 100 us. The second period of time is an intermittent stop time during the heat treatment. Removing the current allows the NFT to relax. In one embodiment, the first period of time is greater than the second period of time. At the end of the second period of time, the laser current is then reapplied and gradually increased from the current level obtained just before the beginning of the second period of time. By the end of the total predetermined period of time, which is a sum of the collective first periods of time and second period of time, the laser current will be at LOPTI. Similarly to the total predetermined period of time, the first period of time and the second period of time may change based upon the material of the NFT. In one embodiment, the first period of time and the second period of time are NFT material independent.

A further heat treatment is also contemplated that is a slight variation on the third heat treatment whereby rather than gradually increasing the current level, a constant current level is applied for the first period of time wherein the constant current level is below LOPTI and at the end of the total predetermined period of time, the power level does not achieve LOPTI. As discussed above, the total predetermined period of time may change based upon the material of the NFT. For example, if the NFT comprises a material having a different thermal conductivity, then the total predetermined period of time may be different. Tungsten, for example, has a lower thermal conductivity than gold and hence the total predetermined period of time for a tungsten NFT would be longer than for gold. Likewise, a gold alloy would likely have a lower thermal conductivity than gold and hence utilize a longer total predetermined period of time for conditioning. Similarly to the total predetermined period of time, the first period of time and the second period of time may change based upon the material of the NFT. In one embodiment, the first period of time and the second period of time are NFT material independent.

Figure 6:
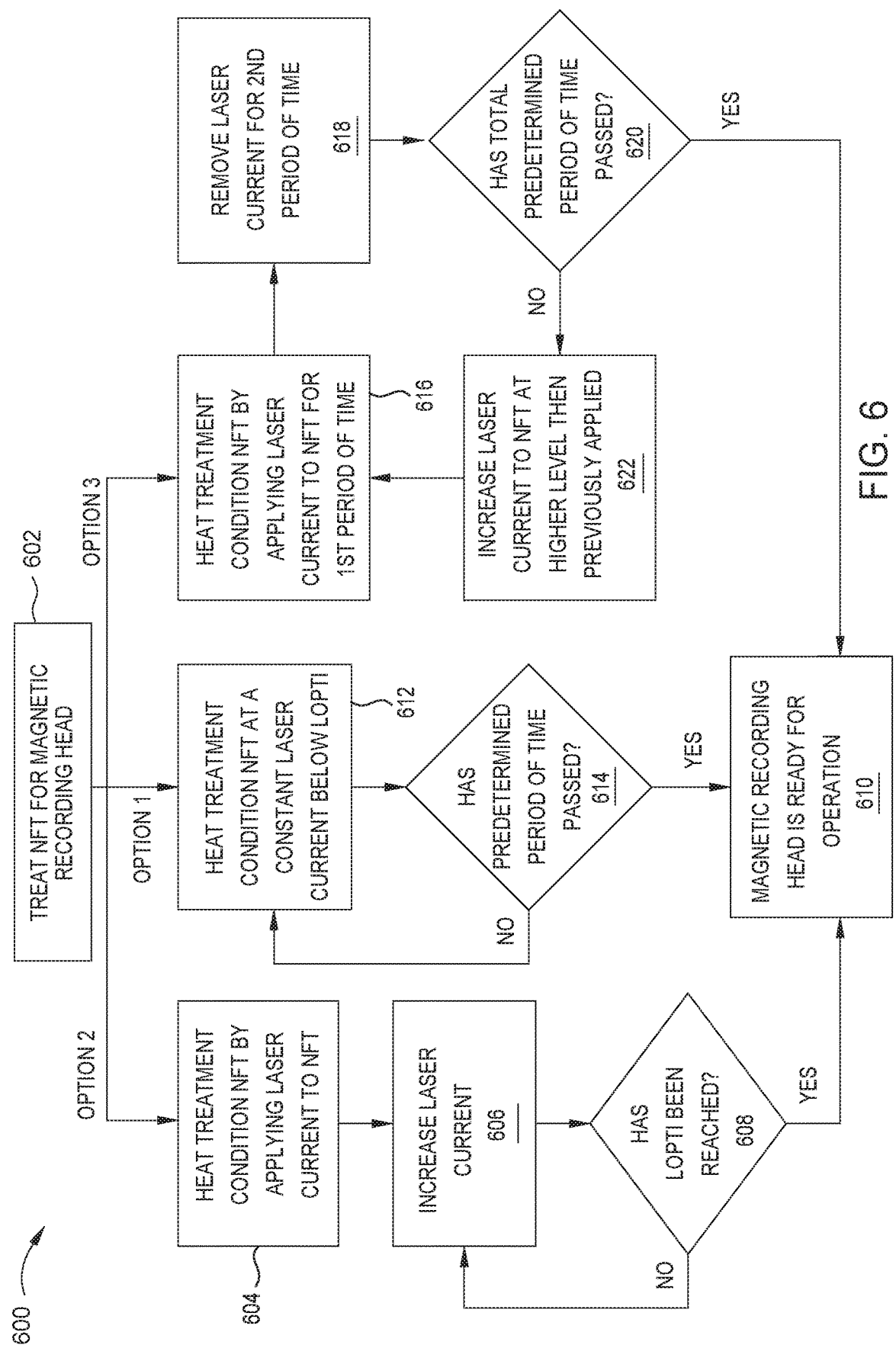
FIG. 6 is a flowchart illustrating a method of treating a magnetic recording head according to one embodiment.

FIG. 6 is a flowchart 600 illustrating a method of treating a magnetic recording head according to one embodiment. Initially, the NFT for the magnetic recording head is fabricated in block 602. Thereafter, in one embodiment prior to using the magnetic recording head to write data to a magnetic media, a heat treatment occurs according to one of three options. In other embodiments, the heat treatment may be applied at other times.

For Option 1, the NFT is heat treatment conditioned by applying laser current to the NFT at block 604. The laser current is then increased in block 606. If the LOPTI has not yet been reached in block 608, then the laser current is increased again in block 606 until the LOPTI has been achieved in block 608. Once LOPTI has been achieved, the magnetic recording head is ready for operation in block 610.

For Option 2, the NFT is heat treatment conditioned at a constant laser current that is below LOPTI for a predetermined period of time in block 612. If the predetermined period of time has not passed in block 614, then the heat treatment conditioning continues in block 612 at the same laser current. If the predetermined period of time has passed in block 614, then the magnetic recording head is ready for operation in block 610.

For Option 3, the NFT is heat treatment conditioned by applying a laser current to the NFT for a first period of time in block 616. After the first period of time is over, the laser current is removed for a second period of time in block 618. If the total predetermined period of time has not passed in block 620, then the laser current is increased to a higher level than previously applied in block 626 and the NFT is heat treatment conditioned again for the first period of time in block 616. The total predetermined period of time is the time for the entirety of the heat treatment or conditioning process to occur. For example, if the entirety of the heat treatment is 20 minutes (i.e., the total predetermined period of time), then all of the first period of times (e.g., 1 minute each) plus all of the second periods (i.e., 1 minute each) of time, collectively add up to the 20 minutes, which would result in five cycles of alternating between the first and second periods of time.

Thereafter, the laser current is removed for the second period of time in block 618. If the total predetermined period of time has passed, then the magnetic recording head is ready for operation in block 610.

It is to be understood that the embodiments discussed herein are applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

In one embodiment, a magnetic media drive comprises: a magnetic recording head; a magnetic media; and a control unit coupled to the magnetic recording head and the magnetic media, wherein the control unit is configured to: apply laser current to the magnetic recording head by ramping up the current from a first level that is below a laser current level that is capable of writing data to the magnetic media to a laser current that is capable of writing data to the magnetic media over a predetermined period of time. The magnetic recording head is disposed at a location laterally spaced from the magnetic media. The control unit is further configure to apply current to the magnetic recording head at a second level that is greater than the first level, and wherein the second level is insufficient to write data to the magnetic media. The first level is between about 72 percent to about 98 percent of the laser current capable of writing data to the magnetic media. The predetermined period of time is between about 18 minutes and about 22 minutes. The magnetic recording head comprises a near field transducer (NFT) and cladding.

In another embodiment, a magnetic media drive comprises: a magnetic recording head; a magnetic media; and a control unit coupled to the magnetic recording head and the magnetic media, wherein the control unit is configured to: apply laser current to the magnetic recording head, wherein the laser current is applied at a first level that is below a laser current level capable of writing data to the magnetic media; increase the laser current to the magnetic recording head from the first level to a second level, wherein the second level is below the laser current level capable of writing data to the magnetic media; and increase the laser current to the magnetic recording head from the second level to the laser current level capable of writing data to the magnetic media. The applying laser current at the first level occurs for a first period of time, wherein applying laser current at the second level occurs for a second period of time, and wherein the first period of time is equal to the second period of time. The first period of time and the second period of time is collectively between about 18 minutes and about 22 minutes. The control unit is further configured to, prior to applying the laser current at the first level: apply laser current to the magnetic recording head, wherein the laser current is applied at a third level that is below the laser current level capable of writing data to the magnetic media; and increase the laser current to the magnetic recording head from the third level to the first level. A difference between the first level and the second level is equal to a difference between the first level and the third level. A difference between the first level and the second level is equal to a difference between the second level and the laser current level capable of writing data to the magnetic media. The magnetic recording head comprises a near field transducer (NFT).

In another embodiment, a magnetic media drive comprises: a magnetic recording head; a magnetic media; and a control unit coupled to the magnetic recording head and the magnetic media, wherein the control unit is configured to: apply laser current to the magnetic recording head, wherein the laser current is applied at a first level that is below a laser current level capable of writing data to the magnetic media, wherein the first level is applied for a first period of time; remove the laser current applied at the first level; apply laser current to the magnetic recording head at a second level that is greater than the first level, wherein the second level is below the laser current level capable of writing data to the magnetic media, wherein the second level is applied for a second period of time; and remove the laser current applied at the second level. The removing the laser current applied at the first level lasts for a third period of time, wherein removing the laser current applied at the second level lasts for a fourth period of time, and wherein the third period of time is equal to the fourth period of time. The first period of time is equal to the second period of time, and wherein the first period of time is not equal to the third period of time. The control unit is further configured to: apply laser current to the magnetic recording head at a third level that is greater than the second level, wherein the third level is below the laser current level capable of writing data to the magnetic media, wherein the third level is applied for a third period of time; and remove the laser current applied at the third level. A difference between the first level and the second level is equal to a difference between the second level and the third level.

In another embodiment, a method of treating a magnetic recording head comprises: applying a current the magnetic recording head for a first period of time, wherein the current is below a current level capable of writing data to a magnetic recording media; determining one of the following: whether the current level capable of writing data to the magnetic recording media been reached; or whether a predetermined period of time passed; and performing one of the following: continuing to apply the current at the current level capable of writing data to the magnetic recording media for a second period of time; or removing application of the current for a third period of time; or increasing the current to a new current level that is below the current level capable of writing data to the magnetic recording media. The current level capable of writing data to the magnetic recording media is reached at the predetermined period of time.

By heat treating the NFT of the magnetic recording head, the NFT is better suited to avoid thermal shock and thermal fatigue, thus increasing the lifetime of the magnetic media drive.

While the foregoing is directed to embodiments of the present disclosure, other and further embodiments of the disclosure may be devised without departing from the basic scope thereof, and the scope thereof is determined by the claims that follow.

What is claimed is:

1. A magnetic media drive, comprising:
a magnetic recording head;
a magnetic media; and
a control unit coupled to the magnetic recording head and the magnetic media, wherein the control unit is configured to:
apply laser current to the magnetic recording head by ramping up the current from a first level that is below a laser current level that writes data to the magnetic media to a laser current level that writes data to the magnetic media over a predetermined period of time, wherein the first level is between about 72 percent to about 98 percent of the laser current level that writes data to the magnetic media.

2. The magnetic media drive of claim 1, wherein the magnetic recording head is disposed at a location laterally spaced from the magnetic media.

3. The magnetic media drive of claim 1, wherein the control unit is further configured to apply current to the magnetic recording head at a second level that is greater than the first level, and wherein the second level is insufficient to write data to the magnetic media.

4. The magnetic media drive of claim 1, wherein the predetermined period of time is between about 18 minutes and about 22 minutes.

5. The magnetic media drive of claim 1, wherein the magnetic recording head comprises a near field transducer (NFT) and cladding.

6. A magnetic media drive, comprising:
a magnetic recording head;
a magnetic media;
a near field transducer (NFT); and
a control unit coupled to the magnetic recording head and the magnetic media, wherein the control unit is configured to:
apply laser current to the magnetic recording head, wherein the laser current is applied for a first period of time at a first level that is below a laser current level that writes data to the magnetic media;
increase the laser current to the magnetic recording head from the first level to a second level, the laser current being applied for a second period of time at the second level, wherein the second level is below the laser current level that writes data to the magnetic media, and wherein the first period of time and the second period of time are collectively determined based on a material of the NFT; and
increase the laser current to the magnetic recording head from the second level to the laser current level that writes data to the magnetic media.

7. The magnetic media drive of claim 6, wherein the first period of time is equal to the second period of time.

8. The magnetic media drive of claim 7, wherein the first period of time and the second period of time is collectively between about 18 minutes and about 22 minutes.

9. The magnetic media drive of claim 6, wherein the control unit is further configured to, prior to applying the laser current at the first level:
apply laser current to the magnetic recording head, wherein the laser current is applied at a third level that is below the laser current level that writes data to the magnetic media; and
increase the laser current to the magnetic recording head from the third level to the first level.

10. The magnetic media drive of claim 9, wherein a difference between the first level and the second level is equal to a difference between the first level and the third level.

11. The magnetic media drive of claim 10, wherein a difference between the first level and the second level is equal to a difference between the second level and the laser current level that writes data to the magnetic media.

12. A magnetic media drive, comprising:
a magnetic recording head;
a magnetic media; and
a control unit coupled to the magnetic recording head and the magnetic media, wherein the control unit is configured to:
apply laser current to the magnetic recording head by ramping up the current from a first level that is below a laser current level that writes data to the magnetic media to a laser current level that writes data to the magnetic media over a predetermined period of time, wherein the predetermined period of time is between about 18 minutes and about 22 minutes.

13. The magnetic media drive of claim 12, wherein the magnetic recording head comprises a near field transducer (NFT).

14. The magnetic media drive of claim 13, wherein the first level is between about 72 percent to about 98 percent of the laser current level that writes data to the magnetic media.

15. The magnetic media drive of claim 12, wherein the NFT comprises gold, gold alloy, or tungsten.

16. The magnetic media drive of claim 5, wherein the predetermined period of time is determined based on a material of the NFT.

17. The magnetic media drive of claim 16, wherein the predetermined period of time increases as a thermal conductivity of the material of the NFT decreases.

18. The magnetic media drive of claim 6, wherein the predetermined period of time increases as a thermal conductivity of the material of the NFT decreases.

19. The magnetic media drive of claim 6, wherein the material of the NFT comprises gold, gold alloy, or tungsten.

* * * * *